United States Patent [19]

Gladstone

[11] Patent Number: 4,947,737
[45] Date of Patent: Aug. 14, 1990

[54] TWIN-CHAMBERED STOPPERING ARRANGEMENT FOR, AND METHOD OF, RIDDLING FERMENTED BOTTLED WINES, PARTICULARLY CHAMPAGNES

[76] Inventor: Ernest Gladstone, 721 Ave. O, Brooklyn, N.Y. 11230

[21] Appl. No.: 352,991

[22] Filed: May 17, 1989

[51] Int. Cl.⁵ ............................................. C12H 1/22
[52] U.S. Cl. .................................. 99/277.1; 215/358; 426/8; 426/112; 426/495
[58] Field of Search .............. 99/275, 276, 277, 277.1, 99/277.2, 323.1, 323.2; 215/355, 358, 361; 426/8, 15, 16, 112, 394, 495

[56] References Cited

U.S. PATENT DOCUMENTS

| | | | |
|---|---|---|---|
| 3,942,423 | 3/1976 | Herzfeld | 99/277.1 |
| 4,440,309 | 4/1984 | Morimoto | 215/360 |
| 4,517,884 | 5/1985 | Jandrich | 426/15 |

*Primary Examiner*—Robert W. Jenkins
*Attorney, Agent, or Firm*—Kirschstein, Ottinger, Israel & Schiffmiller

[57] ABSTRACT

A twin-chambered stoppering arrangement for riddling fermented bottled wines, particularly champagnes, collects sediment produced during fermentation of the wine in a remote chamber of the arrangement. The remote chamber is automatically sealed by a plug which is urged by the internal pressurized bottled wine. The remote chamber is removed from the arrangement and disclosed with the collected sediment therein.

15 Claims, 1 Drawing Sheet

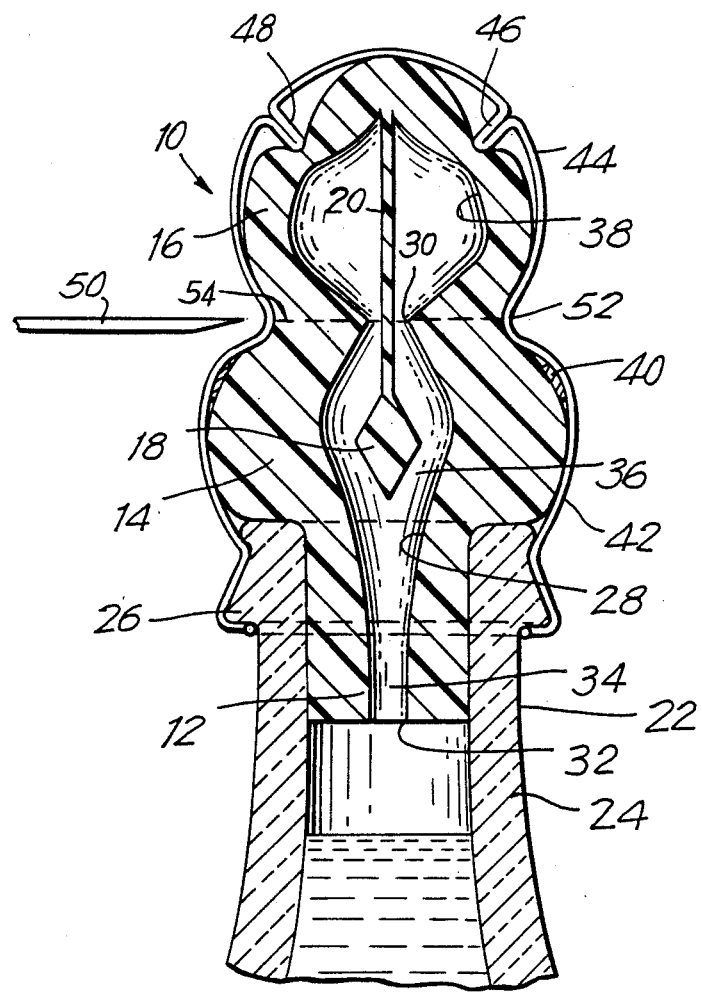

4,947,737

TWIN-CHAMBERED STOPPERING ARRANGEMENT FOR, AND METHOD OF, RIDDLING FERMENTED BOTTLED WINES, PARTICULARLY CHAMPAGNES

BACKGROUND OF THE INVENTION

1. Field of the Invention

This invention generally relates to a new method of, and a twin-chambered stoppering arrangement for, riddling fermented bottled wines, particularly champagnes.

2. Description of Related Art

In the making of a fine bottled wine, and particularly in the making of champagne, which is fermented in a bottle, a base wine, usually a blend of two or more wines, was made in or poured into the bottle. To the base wine, predetermined amounts of sugar and yeast were added. The bottle was capped with a temporary crown cap and put away to ferment. The yeast fed on the sugar and produced alcohol and carbon dioxide gas. The bottle was left this way for a long time, typically from 2 to 5 years. During this time, the wine picked up subtle flavors from the spent yeast and developed a fine, long-lived carbonation.

However, during this time, a sediment also was formed as a natural result of the fermentation process. This sediment included yeast and suspended solids, often in the form of extremely fine particles which impart a cloudy appearance and a gritty taste to the wine. The yeast sediment was quite bitter and it had to be removed, not only to render the wine more palatable, but also to impart a sparkling, clear appearance thereto. The removal of such sediment from bottled wine is known as "riddling".

The traditional riddling method called for the bottled wine to be placed neck down into a slanted rack where it was shaken and turned slightly by hand every day for 6 to 8 weeks. This manual action, aided by gravity, moved the sediment down into the neck of the inverted bottle. Mechanical riddlers of the type described in U.S. Pat. No. 4,356,208 also were used to riddle champagne since they were faster and less expensive than strictly manual methods.

In the past, the yeast sediment was then removed from the neck by a number of methods. According to one method, after the champagne was fermented in the bottle, the entire contents of the bottle were transferred to a filter tank where the sediment was filtered out before the now-sediment-free champagne was poured into another bottle for final corking and sale. In another method, large stainless steel tanks were used to ferment and filter the champagne before the filtered product was poured into a bottle.

In still another method, the bottles were placed neck down in a cold solution after the sediment had moved into the neck of the bottle. The cold solution froze a couple of inches of the sediment and wine in the neck. After a few minutes, the bottle was righted. A disgorging machine popped off the temporary crown cap, thereby allowing the pressurized non-frozen contents within the bottle to shoot out the frozen plug of sediment. The small amount of wine that was lost in the popped-off frozen plug was immediately replaced by an additional dosage typically consisting of wine, sometimes a little brandy, and also usually some sugar.

In the prior art methods, the bottles were sealed with the traditionaly mushroom-shaped cork only after the yeast sediment had been riddled. After "resting" for another 3 to 4 months, or so, the resulting champagne was ready to drink.

Although the known riddling methods have been satisfactory, they have, however, been wasteful of time and money and required an inordinate amount of special handling. Also, when part of the wine was subjected to freezing temperatures, the wine quality suffered. When the traditional "methode champenoise", i.e. where the fermentation and yeast sediment formation occurred in the same bottle in which the champagne was eventually sold, was not employed, the champagne was not of the same quality and was sold at less expensive prices.

SUMMARY OF THE INVENTION

1. Objects of the Invention

It is a general object of this invention to advance the state of the art of making fermented bottled wines with a sparkling, clear appearance and a pleasing taste.

It is another object of this invention to riddle sediment from a fermented bottled wine without resorting to cold solutions and supplementary dosages.

A further object of this invention is to efficiently riddle wine undergoing fermentation in the same bottle in which it is eventually sold.

An additional object of this invention is to produce a wine in a virgin-like state without opening the bottle or freezing its contents.

Still another object of this invention is to more quickly and more inexpensively riddle champagne with a unique twin-chambered stoppering arrangement.

2. Features of the Invention

In keeping with these objects, and others which will become apparent hereinafter, one feature of this invention resides, briefly stated, in a method of, and a twin-chambered stoppering arrangement for, riddling fermented bottled wines, particularly champagnes.

The arrangement comprises friction-tightly inserting an insert into a neck of a bottle of wine which will undergo fermentation within the bottle with concomitant production of sediment to be riddled from the wine. A head is made integral with the insert and is located exteriorly of the neck. The insert and the head together bound a first interior chamber. This first chamber extends along a longitudinal direction through the insert and the head between a pluggable opening on the head and a constantly-open opening on the neck.

A crown is removably mounted on the head. The crown has crown walls which bound a second interior chamber. The crown walls are movable from a retracted to an extended position. A movable plug is mounted on the crown walls for joint movement therewith along the longitudinal direction from an unplugged position in which the plug is remote from the pluggable opening when the crown walls are in the retracted position, to a plugged position in which the plug closes the pluggable opening when the crown walls are in the extended position. The second chamber communicates with the first chamber in the unplugged position, and has a volumetric capacity sufficient for collecting virtually all the sediment flowing through the first chamber and into the second chamber when the bottle is inverted in the unplugged position of the plug.

A holder is also provided for holding the crown walls in the retracted position and for holding the plug in the unplugged position during sediment collection, i.e.

when the bottle is inverted. Means are also provided for releasing the holder, and for moving the crown walls to the extended position, and for simultaneously moving the plug to the plugged position after sediment collection. The release of the holder causes the collected sediment within the second chamber to be sealed therein, and also causes the sediment-free wine to be sealed in the bottle.

Finally, the crown and the sediment collected therein are removed from the head. The sediment-free wine remaining in the bottle is now ready to be stored for a time prior to its eventual sale in the same bottle in which fermentation occurred.

It will thus be seen that, in contrast to the prior art riddling techniques, none of the wine is frozen, and none of the wine is lost during a disgorging process thereby requiring a further auxiliary dosage to supplement the lost wine. No mechanical filter tanks are used which would result in a wine of lesser quality. The wine bottle need not be capped with a temporary crown cap and thereafter be capped with a final cap. Virtually all of the sediment is collected in a remote chamber of a specially designed stopper which is eventually discarded. The resulting wine is very palatable because it has been made according to the traditional "methode champenoise", and has a sparkling, clear appearance.

The aforementioned movability of the crown walls and the plug are advantageously automatically performed by the internal pressurized wine itself which, as noted above, produces carbon dioxide gas during fermentation. As soon as the holder is released, the pressurized wine itself moves the crown walls to the extended position and seals the plug into the pluggable opening. Advantageously, the plug has a tapered surface which is of complementary contour to a tapered seat provided in the pluggable opening. The plug is mounted to the crown, in a preferred embodiment, by being suspended from a filament connected to the crown. A knife may advantageously be used to cut the holder surrounding the crown and, thereupon, for cutting the crown itself from the head in one severing action.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BRIEF DESCRIPTION OF THE DRAWING

The single figure is a partly broken-away sectional view of a twin-chambered stoppering arrangement for riddling fermented bottled wines in accordance with the method of this invention.

DETAILED DESCRIPTION OF THE PREFERRED EMBODIMENT

Referring now to the drawing, reference numeral 10 generally identifies a twin-chambered stoppering arrangement for riddling fermented bottled wines, particularly champagnes. The arrangement 10 includes an insert 12, a head 14 integral with the insert 12, a crown 16 initially integral with but removably mounted on the head 14, and a plug 18 suspended from the crown 16 by a filament 20. The insert 12, head 14, crown 16, plug 18 and filament 20 are advantageously molded of a one-piece, synthetic plastic material construction. Polyethylene is a preferred material.

The insert 12 is friction-tightly inserted, particularly by being press-fitted, into a neck 22 of a bottle 24 typically made of glass. The neck 22 has an outwardly-flared annular lip 26. A base wine, yeast and sugar are introduced into the glass bottle 24 in an amount sufficient to cause fermentation of the base wine into champagne in the bottle in about 2 to 5 weeks. During fermentation, a yeast sediment is produced together with carbon dioxide gas which causes the internal pressure within the bottle to gradually build up in magnitude. As described above, the removal of this objectionable sediment, for reasons of taste and appearance, from the champagne is termed "riddling".

The head 14 is located exteriorly of the neck 22 and, together with the insert 12, have the same general appearance as the traditional mushroom-shaped champagne cork. The insert 12 and the head 14 together bound a first interior chamber 28 which extends along a longitudinal direction interiorly through the insert and the head between a pluggable opening 30 on the head 14 and a constantly-open opening 32 on the neck 12. The interior chamber 28 has a generally cylindrical passageway 34 and an enlarged passageway 36 in which the plug 18 is mounted for movement therein with clearance.

The crown 16 has crown walls which bound a second interior chamber 38 and which are movable from a retracted position to an extended position. The plug 18 is mounted via the filament 20 on the crown walls for joint movement therewith along the longitudinal direction from the illustrated unplugged position to a plugged position. In the unplugged position, the plug 18 is remote from the pluggable opening 30 when the crown walls are in the illustrated retracted position. In the plugged position, the plug 18 closes the pluggable opening 30 when the crown walls are in the extended position.

The crown walls are initially folded in the retracted position and are thereupon unfolded in the extended position. Alternatively, the crown walls may be distended upon movement from the retracted to the extended position. In either or both cases, the plug 18 moves toward the pluggable opening 30 to seal the same when the crown walls are moved. As explained below, this movement can either be the automatic result due to pressure build-up of the internal contents of the wine, or may be caused by manually pulling the crown walls 16 to the extended position. To insure a proper seal, the plug is provided with a tapered surface facing the opening 30, and the opening 30 is formed with a tapered seat of a complementary contour to that of the plug.

The second chamber 38 communicates with the first chamber 28 in the unplugged position. When the bottle 24 is inverted in the unplugged position of the plug 18, the wine, and particularly the sediment, therein is free to enter the opening 32 and flow through the passageways 34 and 36 prior to discharge through the opening 30 into the second chamber 38. The second chamber 38 has an internal volumetric capacity sufficient for collecting virtually all of this sediment and a small amount of wine therein.

In order to insure that the insert 12, head 14 and crown 16 do not become dislodged from the bottle 24 during the build-up of pressure within the bottle while the wine is undergoing fermentation therein, an annular compression ring 40 surrounds and constricts the head 14, thereby anchoring the head in place.

A holder, preferably a first wire cage 42, is placed in tight frictional engagement around the head and the lip 26 of the bottle 24 in order to still further anchor the head 14 and the insert 12 in place. Over time, the build-up of pressure within the bottle can be quite considerable and, therefore, the use of the compression ring 40 and the first cage 42 is important for reasons of safety as well as to prevent escape of gas from the bottle.

Another holder, preferably constituted of a second wire cage 44, which may or may not be made integral with the first cage 42, tightly surrounds the crown 16 for holding the crown walls in the illustrated retracted position during sediment collection. A pair of arms 46, 48 integral with the second cage 44 extends generally radially toward and contact the exterior surface of the crown walls to prevent the latter from undesired movement to the extended position during sediment collection. The cages 42 and 44, together with the compression ring 40 and the friction fit of the insert 12, firmly anchor the stoppering arrangement 10 in place on the neck 22 of the bottle to prevent the arrangement from being popped off during fermentation of the wine.

The second cage 44 is released, according to a preferred embodiment, by a cutting implement, e.g. a knife 50 operative for cutting annularly around the cage 44 around an annular cutting zone 52. The knife 50 is operative to sever the second cage 44 from the first cage 42. The pressurized contents of the bottle 24 now urge the crown walls to the extended position and simultaneously move the plug to the plugged position after sediment collection. The collected sediment is now sealed within the second chamber 38. The sediment-free wine is now sealed within the bottle 24. The plug 18 is automatically held in place within the opening 30.

The crown with the sediment collected therein may now be removed from the head by the same knife 50 which is subsequently operative for cutting the crown 16 from the head 14 by severing the crown along annular zone 54. The top of the plug 18 may be trimmed, if necessary. The cutting implement need not be a knife operative for performing two separate operations, but may advantageously be implemented as a pincers-type tool operative for cutting the second cage 44 a split second before the crown 16 is cut during the same pincers stroke. The crown and the sediment therein may now be conveniently discarded. The sediment-free wine within the capped bottle may now be stored and/or shipped.

According to the method of this invention, the bottle 24 is filled with a base wine, and sugar and yeast are added in amounts sufficient to cause fermentation of the base wine into champagne in the bottle in about 2 to 5 years. The twin-chambered stopper comprised of the aforementioned insert 12, head 14 and crown 16 is inserted into the bottle 24. The annular compression ring 40 is attached around the periphery of the head 14 in the vicinity of, and below, the severing zone 54.

A twin-sectioned wire cage is then mounted over the stopper so that the second cage 44 covers the crown 16, and the first cage 42 covers the head 14 and the lip 26 of the neck of the bottle. The cages 42, 44 hold the stopper in a compressed position during the fermentation period.

When the champagne is ready for final corking after several years have passed, the bottle is inverted and riddled. For example, the bottle may be placed in a riddling machine which mildly shakes the bottle. Alternatively, the bottle may be placed in a slanted rack and shaken and slightly turned every so often by hand. Due to the shaking of the bottle in its inverted position, the yeast sediment formed during the fermentation period falls through the mouth of the bottle into the chambers 28, 38 aided by the force of gravity. The yeast sediment collects in the remote second chamber 38 and, after a while, virtually all of the sediment is accumulated therein. The balance of the wine in the bottle and in the first chamber 28 is substantially clear of yeast sediment.

The second cage 44 which holds the crown 16 in place is now cut away by cutting along cutting zone 52. The moment that happens, the crown 16 unfolds and/or distends due to the internal pressure of the wine within the bottle, i.e. the carbon dioxide gas within the wine. As the crown 16 moves to its extended position, it pulls the plug 18 into the seat or throat of the pluggable opening 30 and seals this part of the stopper and effectively closes fluid communication between the first 28 and the second 38 chambers.

The crown 16 is then removed from the stopper, preferably using the same cutting tool 50 for cutting annularly around and through the severing zone 54. The knife 50 also cuts through the filament 20. The head 14 and insert 12 now serve as the "new" stopper for the bottle which is sold in that condition. The internal pressure of the bottle holds and seals the plug 18 until the remaining cage 42 is opened, the compression ring 40 is removed, and the champagne is served. The plug 18 is of such a configuration that, when it is pulled into the throat of the opening 30, the plug will remain there for a very long time, that is, until the stopper is removed from the bottle. A very mild taper on the order of 3° to 4° on the upper surface of the plug 18 and a corresponding taper at the opening 30 will accomplish a wedge-fit so that the plug 18 will not accidentally dislodge from the stopper.

The champagne produced by this riddling method can be sold at a premium since it is sediment-free, fermented in its own bottle, delivered in a virgin state (i.e. the bottle is never opened and exposed to ambient air), and is of a high quality both in terms of its appearance and unadulterated taste.

The riddling technique described above is of particular benefit for the making of champagne and other pressurized sparkling wines. However, this invention is not intended to be so limited, since it can also be employed in the making of non-pressurized wines, in which event, rather than relying on the internal pressure build-up within the bottle to effect the movement of the plug 18 into wedging engagement with the opening 30, one merely need pull the crown walls from the retracted to the extended position to effect the plugging of the opening 30.

It will be understood that each of the elements described above, or two or more together, also may find a useful application in other types of constructions differing from the types described above.

While the invention has been illustrated and described as embodied in a twin-chambered stoppering arrangement for, and method of, riddling fermented bottled wines, particularly champagnes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed is:

1. A twin-chambered stoppering arrangement for riddling fermented, bottled wines, comprising:
   (a) an insert friction-tightly inserted into a neck of a bottle of wine to undergo fermentation within the bottle with concomitant production of sediment to be riddled from the wine;
   (b) a head integral with the insert and located exteriorly of the neck;
   (c) said insert and said head bounding a first, interior chamber, said first chamber extending along a longitudinal direction through the insert and the head between a pluggable opening on the head and a constantly-open opening on the insert;
   (d) a crown removably mounted on the head, said crown having crown walls which bound a second chamber and which are movable from a retracted to an extended position;
   (e) a movable plug mounted on the crown walls for joint movement therewith along the longitudinal direction from an unplugged position in which the plug is remote from the pluggable opening when the crown walls are in the retracted position, to a plugged position in which the plug closes the pluggable opening when the crown walls are in the extended position;
   (f) said second chamber communicating with the first chamber in the unplugged position and having a volumetric capacity sufficient for collecting virtually all the sediment flowing through the first chamber and into the second chamber when the bottle is inverted in the unplugged position of the plug;
   (g) a holder for holding the crown walls in the retracted position and the plug in the unplugged position during sediment collection, said holder being releasable for moving the crown walls to the extended position and for simultaneously moving the plug to the plugged position after sediment collection, thereby sealing the collected sediment within the second chamber and sealing the sediment-free wine in the bottle; and
   (h) said crown and the sediment collected therein being removable from the head.

2. The arrangement as recited in claim 1, wherein the wine is pressurized during fermentation, and wherein the pressurized wine moves the crown walls to the extended position when the holder is released.

3. The arrangement as recited in claim 2; and further comprising means on the head for compressing the head and anchoring the head and the insert on the neck.

4. The arrangement as recited in claim 3, wherein the compressing means is a compression ring surrounding and constricting the head.

5. The arrangement as recited in claim 3; and further comprising an auxiliary holder for holding the head and the insert on the bottle.

6. The arrangement as recited in claim 5, wherein both holders constitute a twin-section wire cage.

7. The arrangement as recited in claim 1, wherein the plug has a tapered surface, and wherein the pluggable opening has a tapered seat of complementary contour to that of the plug.

8. The arrangement as recited in claim 7, wherein the first chamber has an enlarged region intermediate opposite end regions thereof, said plug being located in said enlarged region in its unplugged position.

9. The arrangement as recited in claim 1, wherein the plug is suspended by a filament from the crown.

10. The arrangement as recited in claim 1, wherein the crown walls are folded in the retracted position, and are unfolded in the extended position.

11. The arrangement as recited in claim 1, wherein the crown walls are distended upon movement from the retracted to the extended position.

12. The arrangement as recited in claim 1, wherein the insert, head, plug and crown are constituted of a synthetic plastic material of one-piece molded construction.

13. The arrangement as recited in claim 1, wherein the holder is severable.

14. The arrangement as recited in claim 1, wherein the crown is cuttable from the head.

15. The arrangement as recited in claim 1, wherein the second chamber is located more remotely along the longitudinal direction from the bottle than the first chamber.

* * * * *